(12) United States Patent
Wu

(10) Patent No.: US 8,595,997 B2
(45) Date of Patent: Dec. 3, 2013

(54) PANEL FASTENING SYSTEM

(75) Inventor: Wenqiang Wu, Shanghai (CN)

(73) Assignee: Racworth Co., Ltd., Shanghai (CN)

( * ) Notice: Subject to any disclaimer, the term of this patent is extended or adjusted under 35 U.S.C. 154(b) by 258 days.

(21) Appl. No.: 13/119,510

(22) PCT Filed: Aug. 17, 2009

(86) PCT No.: PCT/CN2009/073302
§ 371 (c)(1),
(2), (4) Date: Mar. 17, 2011

(87) PCT Pub. No.: WO2010/031286
PCT Pub. Date: Mar. 25, 2010

(65) Prior Publication Data
US 2011/0174947 A1    Jul. 21, 2011

(30) Foreign Application Priority Data
Sep. 18, 2008  (CN) .......................... 2008 1 0200021

(51) Int. Cl.
*E04D 13/18*        (2006.01)
(52) U.S. Cl.
USPC .......................... 52/173.3; 52/460; 136/244
(58) Field of Classification Search
USPC .................. 248/237, 226.11, 220.21, 220.22;
52/173.1, 173.2, 460, 464, 467, 468,
52/506.06, 220.3; 136/244, 251
See application file for complete search history.

(56) References Cited

U.S. PATENT DOCUMENTS

| 5,048,232 | A | | 9/1991 | Miyagawa et al. |
| 6,105,317 | A | * | 8/2000 | Tomiuchi et al. ............ 52/173.3 |
| 6,784,360 | B2 | * | 8/2004 | Nakajima et al. ............ 136/251 |
| 7,260,918 | B2 | * | 8/2007 | Liebendorfer ............... 52/173.3 |
| 7,634,875 | B2 | * | 12/2009 | Genschorek ................. 52/173.3 |
| 2004/0163338 | A1 | * | 8/2004 | Liebendorfer ............... 52/173.1 |
| 2006/0156651 | A1 | | 7/2006 | Genschorek |
| 2008/0053008 | A1 | | 3/2008 | Ohkoshi et al. |

FOREIGN PATENT DOCUMENTS

| CN | 101387151 A | 3/2009 |
| CN | 201284536 Y | 8/2009 |
| WO | 2010031286 A1 | 3/2010 |

OTHER PUBLICATIONS

International Search Report; 6 Pages; Dated Nov. 19, 2009.

* cited by examiner

*Primary Examiner* — Todd M. Epps
(74) *Attorney, Agent, or Firm* — Dickinson Wright PLLC

(57) ABSTRACT

The present invention discloses a fastening system for a panel. The fastening system includes: at least two mounting rails which each has a plurality of engaging open cavities formed therein; and a plurality of engaging slide blocks respectively engaging with the engaging open cavities; wherein the panel is disposed on the mounting rails and fixedly connected with the engaging slide blocks respectively. Basing on the engagement structure, the present invention can be fastened on a surface of a mounted object via two rails and provide high tensile strength and simple installation. The present invention can fix different shapes of panel assemblies on a roof, the ground, a wall or a surface of a framework safely, quickly and stably, and the present invention has a simple structure, light weight and low total costs.

8 Claims, 8 Drawing Sheets

PANEL FASTENING SYSTEM

CROSS REFERENCE TO RELATED APPLICATION

This application is a National Stage of International Application No. PCT/CN2009/073302, filed Aug. 17, 2009. This application claims the benefit and priority of Chinese Application No. 200810200021.2, filed Sep. 18, 2008. The entire disclosure of each of the above applications is incorporated herein by reference.

BACKGROUND OF THE INVENTION

1. Field of the Invention

The present invention relates to a mounting and fastening system for a panel, and more particularly to a mounting system for fastening solar modules or other panels. Specifically, one or a plurality of mounting rails and one or a plurality of solar modules or other panels are fastened via fasteners and corresponding engaging slide blocks and clamps to form a fastened assembly.

2. Background of the Invention

Solar energy, as one kind of sustained clean energy, has great potential in development and application. With the present situation of increasing globe energy demand, solar photovoltaic power generation is being developed rapidly as a sustainable substitution for energy.

Solar photovoltaic power generation is a technology for converting solar energy into electrical energy. The core of the technology is semiconductor materials which can release electrons. The most common semiconductor material is silicon that is abundant in the earth's crust. A solar photovoltaic cell has two layers of semiconductors, of which one layer is an anode and the other layer is a cathode. The interface between the anode and the cathode produces electric current when the semiconductor is in the sun.

Solar photovoltaic power generation is a simple technology with low risk, which can almost be applied in any place where there is sunshine. It means that it can be disposed on roofs and walls of public and personal buildings. So solar photovoltaic power generation not only provides a lot of electric power, but also saves land occupation.

The most important feature of solar photovoltaic power generation is its low $CO_2$ emissions from power generation. As well known, $CO_2$, as the main greenhouse gas, is responsible for climate change.

Recently, energy and environment problems become hot worldwide. For the sustainable development of energy and environment, many countries have all focused their attention on solar power. From a long-term point of view, solar photovoltaic power generation will play an important role in world energy consumption in the future.

A mounting system for solar photovoltaic power generation is configured by mounting one or a plurality of solar photovoltaic modules on a mounting support with a certain strength. Most of solar module manufacturers and suppliers don't produce this kind of mounting system.

For installation of solar modules or other panels, German Patent No. DE19717996A1 discloses a connection method of solar collectors and roof brackets. In the method, the roof anchors are fixed on the wood strips on which the tiles are placed on a roof and the other ends of the roof anchors clamp tubes on which the solar collectors are placed. The solar collectors and the tubes are fixed by another bracket. In the mounting method, the space between the tiles and the solar collectors is so small that the installation is inconvenient.

U.S. Pat. No. 6,105,317 only discloses a top mounting system for solar photovoltaic modules. During installation, it demands that the distance between two rails is a certain width of solar photovoltaic modules and two rails must be just located and fastened on fixed points on a surface of a mounted object. So the fixed points must be precalculated accurately and premade.

U.S. Pat. No. 6,360,491B1 discloses a mounting method for solar modules with slidable inserts. In the method, the bottom of the mounting rail needs to be drilled at site so that bolts can pass through the drilled holes to fasten the rail and the support. So the mounting method increases the difficulty and strength of installation, and can only be applied to the installation of the top of the solar modules.

German Patent No. DE10132557A1 provides a roof mounting system for solar photovoltaic modules. The mounting system fastens the solar photovoltaic modules between a press board and base rails via bolts. The tooth surfaces of the base rails and the support mounted on the roof are engaged closely via bolts so that the base rails and the support are fastened together. Since the bolts are rotated into the opening grooves formed in the base rails which are made of a relative soft material to achieve the engagement of the system, the tensile strength of the system is affected.

U.S. Pat. No. 7,260,918B2 provides a mounting system for solar modules or other panels. Though the system can implement the installation of tops and back surfaces of solar modules and other panels, it needs that the rigidity of rails meets the demand of the tensile strength of the system, which will increase the wall thickness of the rails and cause an increase in the amount of mounting materials.

US Patent Application Publication No. US200610086382A1 discloses a mounting method in which solar modules are disposed between the upper rail and the lower rail, fasteners pass through the top of the upper rail and the bottom of the lower rail to fasten the solar modules or other panels and the upper and the lower rails together and the lower rail is connected with a support rail via fasteners closely. The whole mounting system needs three rails so that the amount of mounting materials is increased greatly, thereby the mounting costs and workloads are increased.

US Patent Application Publication No. US2006/0156651A discloses a mounting system of an engaging slide block structure. The system needs combine mounting rails with connecting rails to form system rails, so the mounting processes are increased and the amount of mounting materials is increased.

Hence, in conventional mounting systems for solar modules or other panels, few products can accomplish the fastening installation of tops or bottoms of solar modules or other panels on one mounting rail and the fastening connection of solar modules or other panels and the mounting rail on a surface of a mounted object. Additionally, such conventional products, which can perform the above work using one rail, need to use heavy rails with large consumption in metals to improve tensile strength of their mounting systems, so the consumption of raw materials of the mounting systems is high.

SUMMARY OF THE INVENTION

An object of the present invention is to provide a fastening system for a panel which can be fastened on a surface of a mounted object via two mounting rails by engaging and to provide high tensile strength and simple installation. The present invention can fix different shapes of panel assemblies on a roof, the ground, a wall or a surface of a framework safely, quickly and stably; and the present invention has a simple structure, light weight and low total costs.

The technical concept of the present invention is as follows: the mounting rail with engagement structures of the present mounting system includes two engaging open cavities for engaging slide blocks sliding linearly along the rail and a sliding open groove with a plane bottom for a bolt sliding linearly along the rail. A first engaging open cavity is located in the upper portion of the mounting rail and has the cross section shaped like E with a downward opening. A second engaging open cavity is located below the right side of the first engaging open cavity of the mounting rail and forms an angle of 90 degrees with the first engaging open cavity. The three base sides of the two engaging open cavities, opposite to their openings, are collinear. The sliding open groove with a plane bottom is located in the middle of the left side of the first engaging open cavity and forms an angle of 90 degrees with the first engaging open cavity.

In each engaging open cavity of the mounting rail, a pair of protruding portions protrudes from the inner sides of the two side lips of the opening of the cavity and engages with grooves of the engaging slide block. Each engaging open cavity further has a pair of foot poles parallel to two sides of the cavity, with a pair of feet with inclined faces formed on the top ends of the foot poles, wherein the soles of the feet with inclined faces confront and are parallel to the outside of the two side lips of the opening of the cavity, and the feet with inclined faces are parallel to each other, with the tiptoes opposite to each other and the insteps and the soles forming an acute angle therebetween. Alternatively, a pair of right-angled feet is formed on the top ends of the foot poles, wherein the soles of the right-angled feet confront and are parallel to the outside of the two side lips of the opening of the cavity, and the right-angled feet are parallel to each other, with the tiptoes opposite to each other and the insteps parallel to the soles. The two pairs of foot poles and feet separate the collinear bottoms of the two engaging open cavities, which are opposite to the openings of the two engaging open cavities, into three parts.

The cross section of each engaging slide block is shaped like C with a downward opening. Two grooves are formed in the cross section of the engaging slide block and respectively extend along the two ends of the engaging slide block to engage with the two protruding portions protruding from the inner sides of the two side lips of the opening of the engaging open cavity. A pair of opposite recesses with inclined faces or right-angled recesses is formed in the C-shaped opening to engage with the feet with inclined faces or right-angled feet standing oppositely in the engaging open cavity. The engagement portions of the engaging slide blocks and the engagement portions of the mounting rail are fastened via fasteners to prevent the engaging slide blocks from sliding axially along the mounting rail in the engaging open cavities and avoid that the engaging slide blocks move horizontally and vertically in the engaging open cavities of the mounting rail and the engaging open cavities of the mounting rail produce deformation when the engaging slide blocks are acted upon by an external force. A threaded hole is formed in the center position between the two grooves of the engaging slide block and may be engaged with a matching fastening bolt.

In the mounting system, top flanges of end clamps are pressed on the top frame strips of solar modules or other panels and bolts pass through holes of horizontal flanges of the end clamps and engage with the engaging slide blocks in the first engaging open cavity of the mounting rail, wherein the number of the engaging slides blocks corresponds to that of the end clamps, thereby the solar modules or other panels are fastened on the top end of the mounting rail.

In the mounting system, top flanges of middle clamps are pressed on the top frames of solar modules or other panels and bolts pass through holes of top flanges of the middle clamps and middle support, and engage with the engaging slide blocks in the first engaging open cavity of the mounting rail, wherein the number of the engaging slides blocks corresponds to that of the middle clamps, thereby the solar modules or other panels are fastened in the middle of the top of the mounting rail.

In the mounting system, back clamps can be fastened on solar modules or other panels via fasteners passing through holes of horizontal flanges of the back clamps and holes of back frames of solar modules or other panels. At the same time, the bolts pass through holes of vertical flanges of the back clamps and an opening slide way with a plane bottom of the mounting rail to engage with nuts, so as to fasten the back clamps on the side surface of the mounting rail. Thereby, the back surfaces of the solar modules or other panels and the back clamps are fastened on the mounting rail.

The mounting rail can be fastened via the engaging slide block mounted in the second engaging open cavity and a bolt passing through a vertical flange of an L-shaped fastener. The mounting rail fastened by the L-shaped fastener may be securely connected to a roof, the ground, a wall or a surface of a framework based on the engagement of a hole of a horizontal flange of the L-shaped fastener and a fastener.

To achieve the above-mentioned object, a fastening system for a panel in accordance with the present invention is provided. The fastening system for a panel includes:

at least two mounting rails, each having a plurality of engaging open cavities formed therein; and a plurality of engaging slide blocks, respectively engaging with the engaging open cavities;

wherein the panel is disposed on the mounting rails and fixedly connected with the engaging slide blocks respectively.

Advantageously, the number of the engaging slide blocks is two and the number of the engaging open cavities is two, and the engaging open cavities respectively are a first engaging open cavity formed in a top surface of the mounting rail and a second engaging open cavity formed in a side surface of the mounting rail.

Advantageously, the panel includes a plurality of top frame strips and a back frame; and the fastening system for a panel further includes:

a middle clamp, including a top flange which has two side lips respectively formed on two ends thereof to engage with the top frame strips for position limitation; a pair of vertical flanges being under the top flange and a flange support disposed horizontally between the vertical flanges; wherein the middle clamp is fixedly connected with one of the engaging slide blocks, which engages with the first engaging open cavity, via a fastening bolt; and an L-shaped fastener, including a vertical flange and a horizontal flange, wherein the vertical flange is fixedly connected with the other engaging slide block, which engages with the second engaging open cavity, via a fastening bolt.

Advantageously, a sliding open groove with a plane bottom is formed in one side of the mounting rail which is on the back side of the second engaging open cavity; and the fastening system for a panel further includes:

a back clamp, including a horizontal flange and a vertical flange, a side lip formed on each of the free ends of the horizontal flange and the vertical flange; and a bolt, having an end shape corresponding to the shape of the sliding open groove with a plane bottom and slidably disposed in the sliding open groove with a plane bottom, wherein the vertical flange and the bolt are fastened and the horizontal flange is fixedly connected with the back frame via a bolt.

Advantageously, the fastening system for a panel further includes an end clamp which is Z-shaped and has a top flange, a vertical flange and a horizontal flange connected in turn, wherein the top flange has a side lip formed on the end thereof to engage with the top flange strip for position limitation; the horizontal flange is tightly connected with an engaging slide block, which is engaged with the first engaging open cavity, via a fastening bolt.

Advantageously, the engaging slide block has two parallel grooves formed in an upper surface thereof and two parallel recesses with inclined faces or right-angled recesses formed in a lower surface thereof;

each of the first engaging open cavity and the second engaging open cavity has a pair of protruding portions engaged with the grooves and a pair of parallel foot poles which has a pair of feet with inclined faces or right-angled feet formed on top ends thereof, and the pair of feet with inclined faces or right-angled feet is engaged with the recesses with inclined faces or the right-angled recesses of the engaging slide block.

Advantageously, the panel (14) is a solar panel module.

Accordingly, comparing with the prior art, the present invention has the advantages as follows: basing on the engagement structure of the present invention, different sizes and shapes of solar modules or other panels can be fixed on a roof, the ground, a wall or a surface of a framework more safely, quickly and stably; and the present invention has the advantages of high tensile strength, light weight, simple installation and low costs.

BRIEF DESCRIPTION OF THE DRAWINGS

FIG. 4 is a front view of a mounting rail of the present invention;

DETAILED DESCRIPTION OF THE PREFERRED EMBODIMENTS

Figure 1:
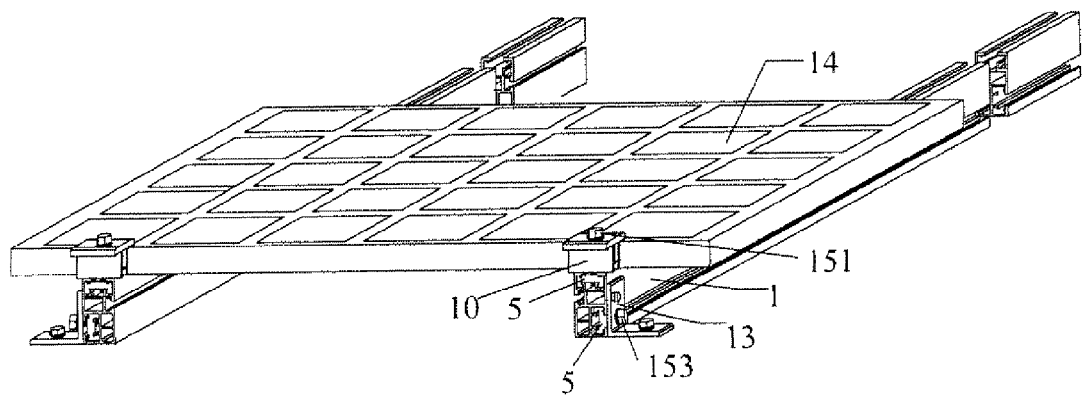
FIG. 1 is a perspective view of a fastening system of the present invention.

As shown in FIG. 1, number 5 indicates engaging slide blocks, number 10 indicates middle clamps, number 13 indicates L-shaped fasteners, and numbers 151 and 153 indicates fastening bolts. The preferred embodiment includes a panel 14 and two mounting rails 1, and the panel 14 is disposed on the mounting rails 1 to form a mounting system for solar modules or a plurality of other panels. The mounting rails 1 are formed by extruding aluminum alloy.

Figure 2:
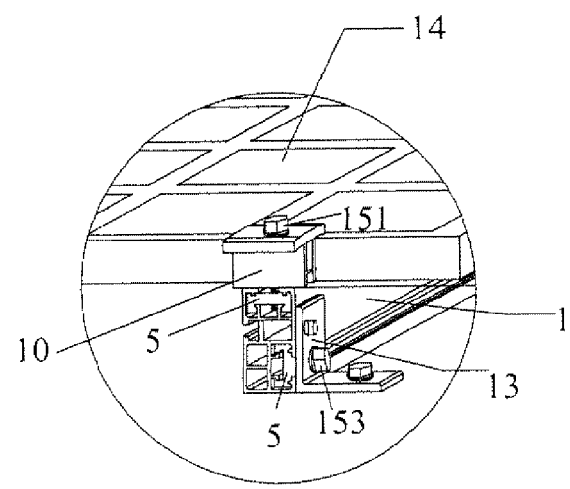
FIG. 2 is an enlarged view of engagement portions of mounted assemblies in FIG. 1.
Figure 3:
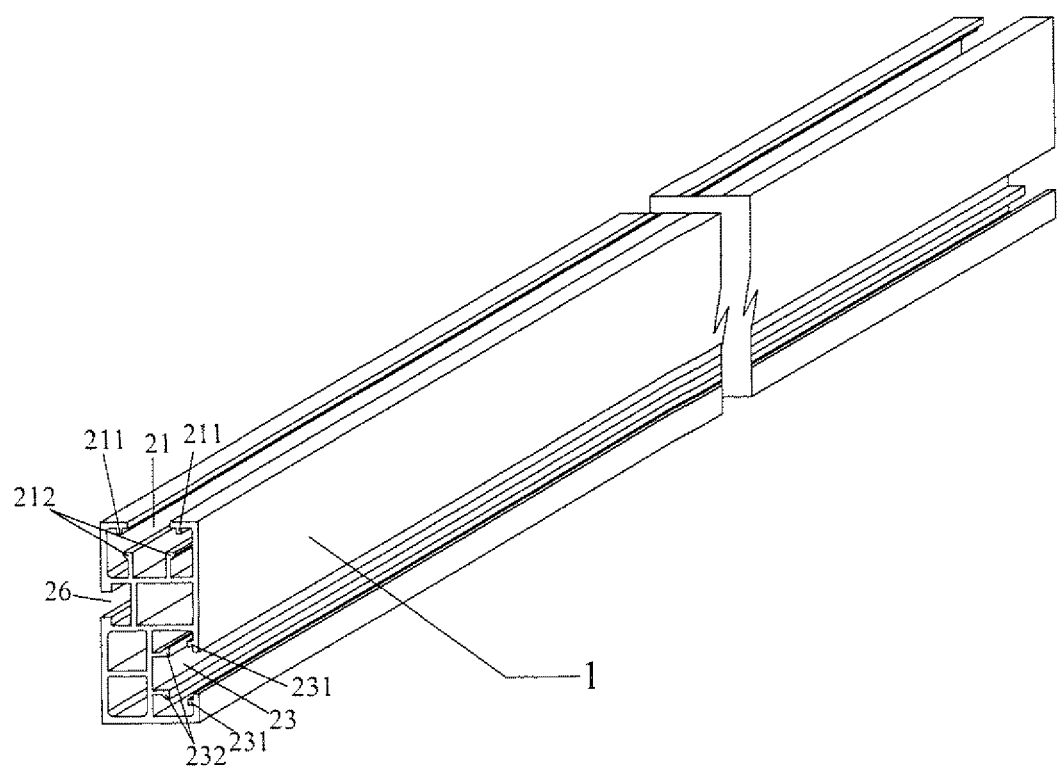
FIG. 3 is a perspective view f a mounting rail of the present invention.
Figure 4A:
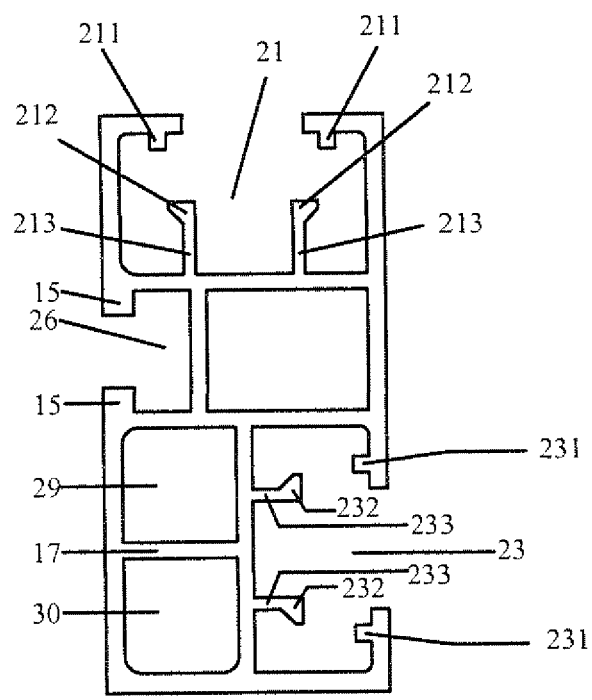
FIG. 4A is a front view of a mounting rail of a preferred embodiment of the present invention.
Figure 4B:
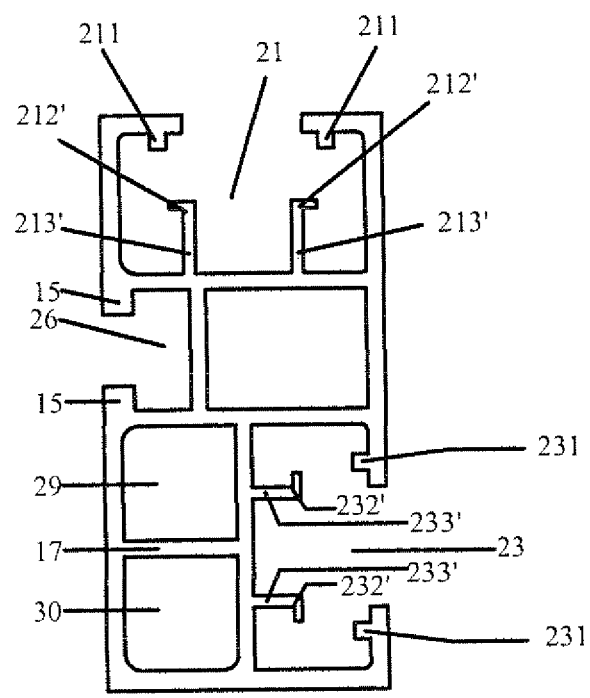
FIG. 4B is a front view of a mounting rail of another preferred embodiment of the present invention.

As shown in FIGS. 2-4, the mounting rails 1 each has a first engaging open cavity 21, a second engaging open cavity 23, a sliding open groove with a plane bottom 26, and two cavities 29, 30 which are spaced by a support 17.

The first engaging open cavity 21 is located in the upper portion of the section of the mounting rail 1 and extends axially along the mounting rail 1. The second engaging open cavity 23 is located below the right side of the first engaging open cavity 21 and forms an angle of 90 degrees with the first engaging open cavity 21, and the second engaging open cavity 23 extends axially along the mounting rail 1. The sliding open groove with a plane bottom 26 is located in the middle of the left side of the first engaging open cavity 21 and forms an angle of 90 degrees with the first engaging open cavity 21, and the sliding open groove with a plane bottom 26 extends axially along the mounting rail 1. The two cavities 29, 30 are located on the left of the second engaging open cavity 23 and extend axially along the mounting rail 1.

Figure 7:
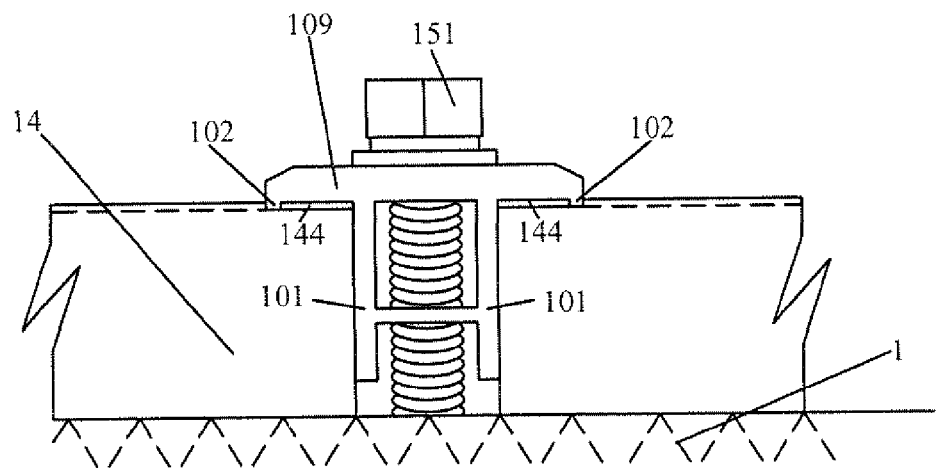
FIG. 7 is a front view of a middle clamp of the present invention, fixed on the top of the mounting rail.

As shown in FIG. 2 and FIG. 7, a middle clamp 10 (in FIG. 10) and an engaging slide block 5 (in FIG. 5) are disclosed. The engaging slide block 5 has the shape corresponding to that of the first engaging open cavity 21 and extends into the first engaging open cavity 21. The middle clamp 10 and the engaging slide block 5 are fixedly connected via a fastening bolt 151.

Figure 10:
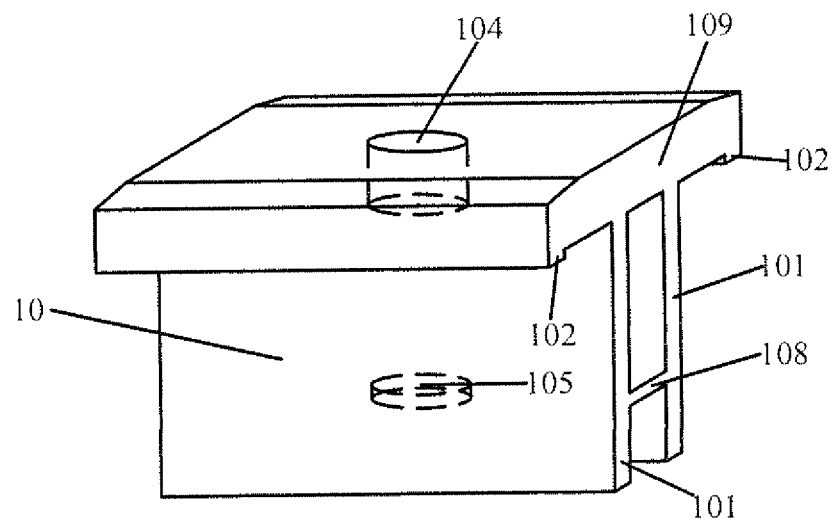
FIG. 10 is a perspective view of the middle clamp of the present invention.

As shown in FIG. 7 and FIG. 10, the middle clamp 10 includes a top flange 109 which has two side lips 102 respectively formed on two ends thereof and a hole 104 defined in the middle thereof. A pair of vertical flanges 101 is located under the top flange 109. A flange support 108 is disposed horizontally between the vertical flanges 101. A hole 105 is formed in the middle of the flange support 108, and the centers of the holes 104,105 are on the same axis. The fastening bolt 151 passes through the hole 104 and the hole 105. The vertical flanges 101 are attached to the edges of the rim of the panel 14 closely and two top frame strips 144 of the panel 14 are limited between the side lips 102 and the vertical flanges 101 by the side lips 102.

Figure 5A:
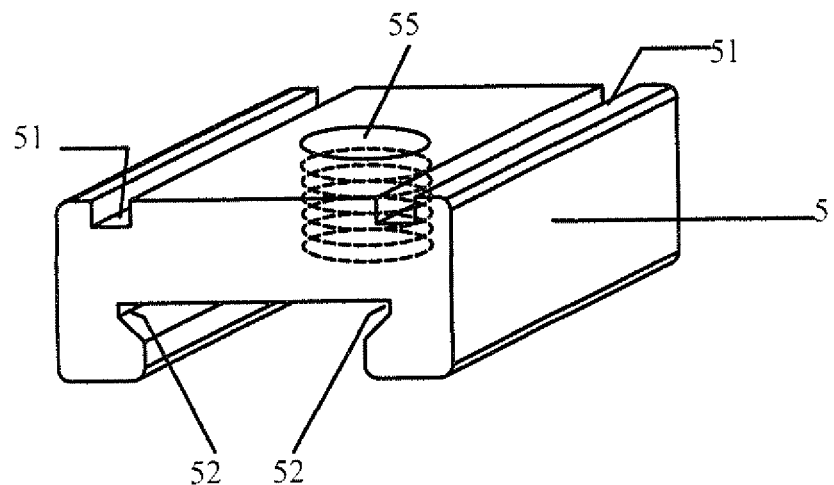
FIG. 5A is a perspective view of an engaging slide block of a preferred embodiment of the present invention.

As shown in FIG. 5A, two grooves 51 are formed in the section of the engaging slide block 5, respectively extending along the two ends of the engaging slide block 5. A threaded hole 55 is formed in the center position between the two grooves 51 and may be engaged with a matching fastening bolt 151. A downward opening is formed in the section of the engaging slide block 5 and a pair of opposite recesses with inclined faces 52 is formed in the depressed portion of the downward opening. Alternatively, in another preferred embodiment of the present invention, a pair of opposite right-angled recesses 52' is formed in the depressed portion of the downward opening, as show in FIG. 5B.

Figure 5B:
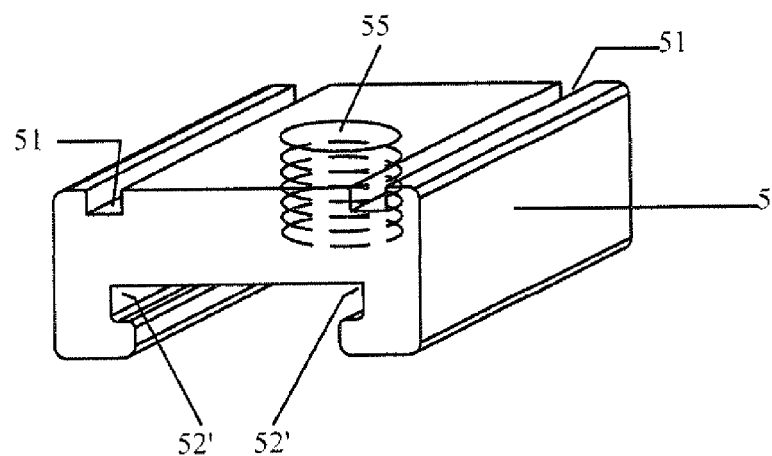
FIG. 5B is a perspective view of an engaging slide block of another preferred embodiment of the present invention.

As shown in FIG. 4A, the first engaging open cavity 21 has a pair of protruding portions 211 protruding from the inner sides of the two side lips of the opening of the cavity 21, which may engage with the grooves 51 of the engaging slide block 5 (see FIG. 5). The first engaging open cavity 21 further has a pair of parallel foot poles 213 parallel to side wings formed on two sides of the opening of the cavity 21, which separates the bottom of the cavity 21 into three parts. A pair of feet with inclined faces 212 is formed on the top ends of the foot poles 213 to engage with the recesses with inclined faces 52 (see FIG. 5A). Alternatively, in another preferred embodiment of the present invention, a pair of right-angled feet 212' is disposed on the top ends of foot poles 213' to engage with the right-angled recesses 52' (see FIG. 5B). The pair of right-angled feet 212' may act as hooks to engage with the right-angled recesses 52' firmly. In this way, the engaging slide block 5 is assembled in the first engaging open cavity 21 (in FIG. 2).

During the assembly of the middle clamp 10, the fastening bolt 151 passes through the hole 104 and the hole 105 of each of one or a plurality of middle clamps 10 in turn and engages with the threaded hole 55 of each of one or a plurality of the engaging slide blocks 5 disposed in the first engaging open cavity 21 (see FIG. 2, FIG. 3, FIG. 5 and FIG. 10).

Figure 6:
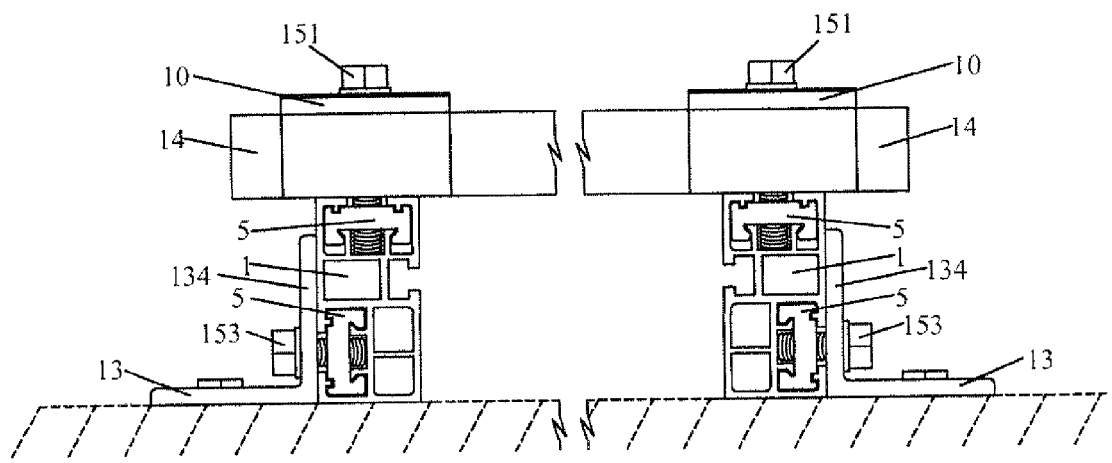
Figure 8:
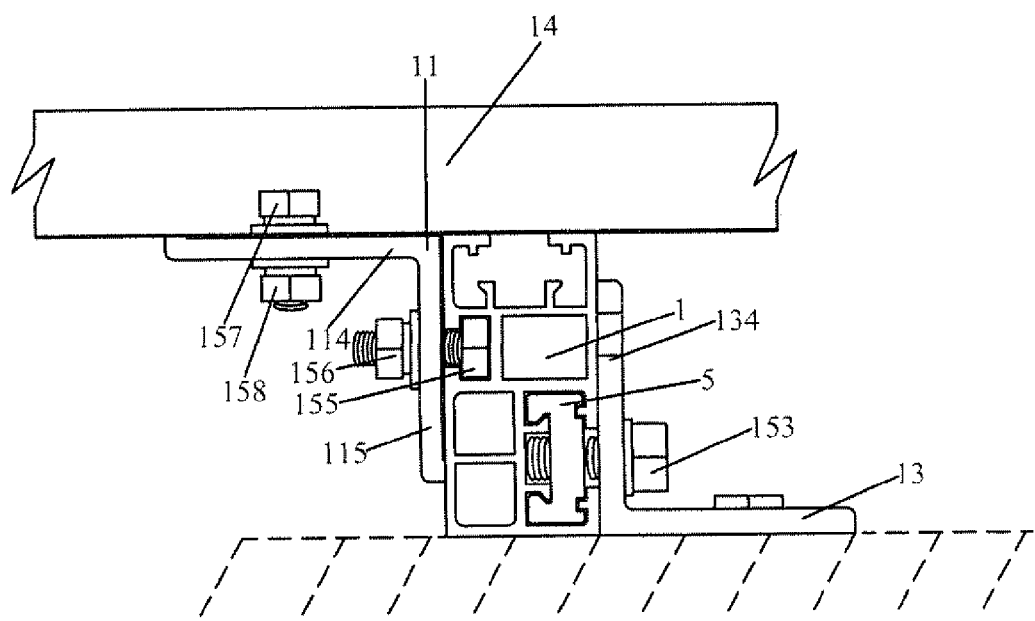
FIG. 8 is a front view of a back clamp of the present invention, mounted on one side of the mounting rail and fixed on a surface of an object.

As shown in FIG. 2, FIG. 6 and FIG. 8, the L-shaped fastener 13 (in FIG. 13) and the engaging slide block 5 (FIG. 5) are assembled. The engaging slide block 5 has the shape corresponding to that of the second engaging open cavity 23 and extends to the second engaging open cavity 23. One end of the L-shaped fastener 13 is fixedly connected with the engaging slide block 5 via the fastening bolt 153 and the other end thereof may be securely connected to a roof, the ground, a wall or a surface of a framework.

Figure 13:
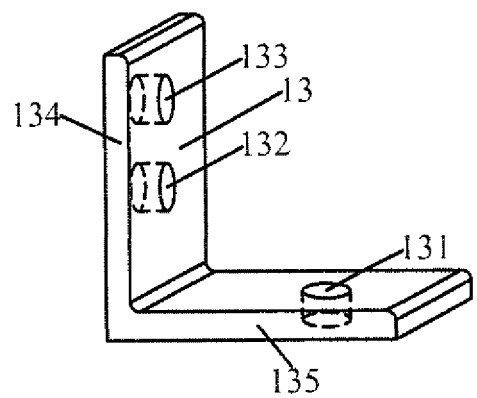
FIG. 13 is a perspective view of the L-shaped fastener of the present invention.

As shown in FIG. 13, the vertical flange 134 of the L-shaped fastener 13 has two holes 132, 133 formed therein and the horizontal flange 135 thereof has a hole 131 formed therein.

As shown in FIG. 4A, the second engaging open cavity 23 has a pair of protruding portions 231 protruding from the inner sides of the two side lips of the opening of the cavity 23, which may engage with the grooves 51 of the engaging slide block 5 (see FIG. 5). The second engaging open cavity 23 further has a pair of parallel foot poles 233 parallel to side wings formed on two sides of the opening of the cavity 23, which separates the bottom of the cavity 23 into three parts. A pair of feet with inclined faces 232 is formed on the top ends of the foot poles 233 to engage with the recesses with inclined faces 52 (see FIG. 5). Alternatively, in another preferred embodiment of the present invention, a pair of right-angled feet 232' is disposed on the top ends of foot poles 233' to engage with right-angled recesses 52' (see FIG. 5B). The pair of right-angled feet 232' may act as hooks to engage with the right-angled recesses 52' firmly.

During assembly, as shown in FIG. 6 and FIG. 8, the fastening bolt 153 passes through the hole 132 or the hole 133 of the vertical flange 134 of each of one or a plurality of the L-shaped fasteners 13 (see FIG. 13) and engages with the threaded hole 55 of each of one or a plurality of the engaging slide blocks 5 which is mounted in the second engaging open cavity 23 formed in the lower right side of the mounting rail 1 (see FIG. 4 and FIG. 5). The horizontal flange 135 of the L-shaped fastener 13 may be securely connected to a roof, the ground, a wall or a surface of a framework. Thereby, the panel 14, the mounting rail 1, the middle clamp 10, the engaging slide block 5 and the L-shaped fastener 13 establish a secure connection for the top installation of the mounting rail 1.

As shown in FIG. 4 and FIG. 8, a back clamp 11 (in FIG. 11) and a bolt 155 are disclosed. The bolt 155 has the shape corresponding to that of the sliding open groove with a plane bottom 26 and extends into the sliding open groove with a plane bottom 26. The back clamp 11 and the sliding open groove with a plane bottom 26 are connected via the bolt 155.

Figure 11:
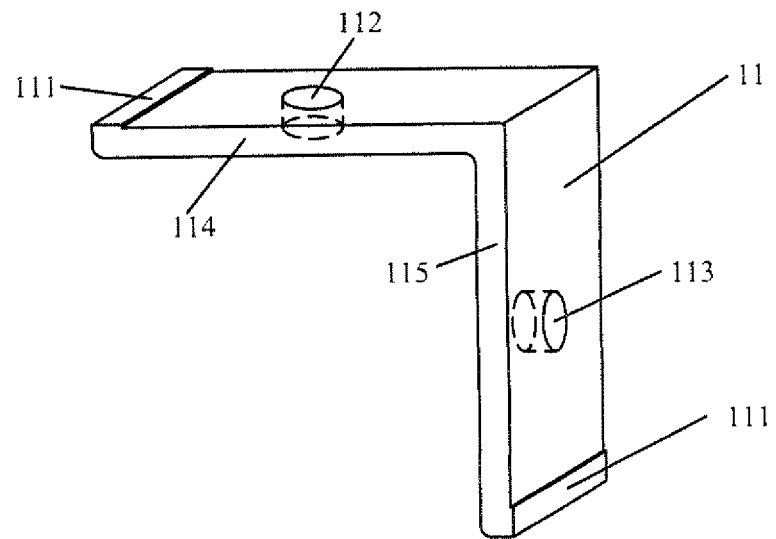
FIG. 11 is a perspective view of the back clamp of the present invention.

As shown in FIG. 11, the back clamp 11 is a connecting member for connecting the mounting rail 1 with the panel 14 on the back side (see FIG. 1). A horizontal flange 114 and a vertical flange 115 of the back clamp 11 form a right angle therebetween. A side lip 111 is formed on each of the free ends of the horizontal flange 114 and the vertical flange 115. The horizontal flange 114 has a hole 112 formed in the center thereof and the vertical flange 115 has a hole 113 formed in the center thereof.

As shown in FIG. 4, the sliding open groove with a plane bottom 26 has two side lips 15 respectively formed on the two sides thereof, which engage with the end of the bolt 155 (see FIG. 8).

Figure 14:
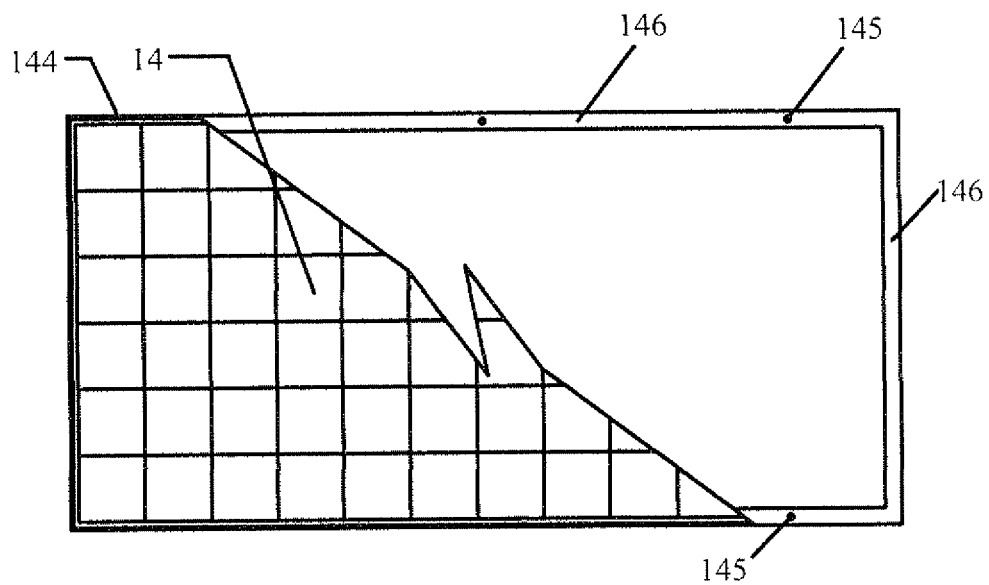
FIG. 14 is a cross-sectional view of the panel of the present invention.

In assembly, as shown in FIG. 8, FIG. 4 and FIG. 11, the fastening bolt 155, which is disposed in the sliding open groove with a plane bottom 26, passes through the hole 133 of the vertical flange 115 of the back clamp 11 and engages with a matching nut 156 to fasten the mounting rail 1 and the back clamp 11, so that the back clamp 11 is fixed on the side of the mounting rail 1 tightly. A bolt 157 passes through the hole 112 of the horizontal flange 114 of the back clamp 11 and a hole 145 (in FIG. 14) of a back frame 146 of the panel 14 and engages with a matching nut 158. Accordingly, the back side of the panel 14 is fixed on the horizontal flange 114 of the back clamp 11.

Figure 9:
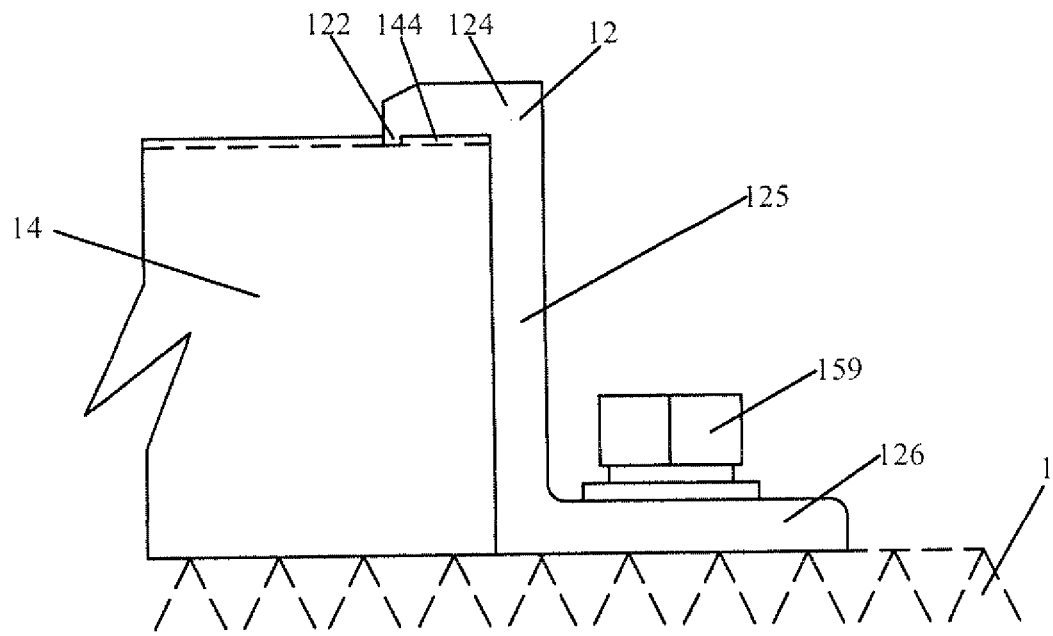
FIG. 9 is a front view of a panel and an end clamp of the present invention, fixed on the top of the mounting rail.

As shown in FIG. 9, a Z-shaped end clamp 12 (in FIG. 12) is tightly connected with the engaging slide block 5 via a fastening bolt 159 (not shown), wherein the engaging slide block 5 is disposed in the first engaging open cavity 21 of the mounting rail 1.

Figure 12:
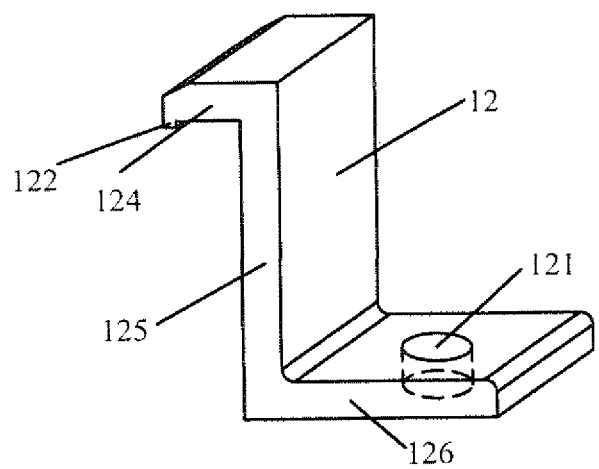
FIG. 12 is a perspective view of the end clamp of the present invention.

As shown in FIG. 12, the end clamp 12 has a side lip 122 formed on the end of the top flange 124 thereof. One end of the vertical flange 125 forms an angle of 90 degrees with the top flange 124 and the other end thereof forms an angle of 90 degrees with the horizontal flange 126 which has a hole 121 formed in the center thereof.

During assembly, as shown in FIG. 9, the top frame strip 144 of the panel 14 contacts with the top flange 124 of the end clamp 12 closely, and the edge of one end of the panel 14 contacts with the vertical flange 125 of the end clamp 12 closely. The side lip 122 can prevent the panel 14 from moving away from the vertical flange 125 along the axis of the mounting rail 1 after the fastening bolt 159 passes through the hole 121 (not shown) to fasten the side lip 122 and the engaging slide block 5.

It will be understood by those skilled in the art that what are disclosed above are only the specification and the drawings of the preferred embodiment of the present invention and it is therefore not intended that the present invention be limited to the particular embodiment disclosed. It will be understood that various equivalent changes may be made depending on the specification and the drawings of the present invention without departing from the scope of the present invention.

LIST OF REFERENCE NUMERALS 1 mounting rail, 5 engaging slide block, 51 groove, 52 recess with an inclined face, 52' right-angled recess, 55 threaded hole, 10 middle clamp, 101 vertical flange, 102 side lip, 104, 105 hole, 108 flange support, 109 top flange, 11 back clamp, 111 side lip, 112, 113 hole, 114 horizontal flange, 115 vertical flange, 12 end clamp, 121 hole, 122 side lip, 124 top flange, 125 vertical flange, 126 horizontal flange, 13 L-shaped fastener, 131, 132, 133 hole, 134 vertical flange, 135 horizontal flange, 14 panel, 144 top frame strip, 145 hole, 146 back frame, 151, 153, 155, 157, 159 fastening bolt, 156, 158 nut, 17 support, 21 first engaging open cavity, 211 protruding portion, 212 foot with an inclined face, 212' right-angled foot, 213, 213' foot pole, 23 second engaging open cavity, 231 protruding portion, 232 foot with a inclined face, 232' right-angled foot, 233, 233' foot pole, 26 sliding open groove with a plane bottom, 29, 30 cavity

What is claimed:

1. A fastening system for a panel, comprising:
   at least two mounting rails (1), each having a number of engaging open cavities formed therein; and
   a number of engaging slide blocks (5), respectively engaging with the engaging open cavities; wherein the number of the engaging slide blocks (5) is two and the number of the engaging open cavities is two, and the engaging open cavities respectively are a first engaging open cavity (21) formed in a top surface of the mounting rail and a second engaging open cavity (23) formed in a side surface of the mounting rail;
   wherein the panel (14) including a plurality of top frame strips (144) and a back frame (146) is disposed on the mounting rails and fixedly connected with the engaging slide blocks (5) respectively; and
   the fastening system for the panel further comprises:
   a middle clamp (10), including a top flange (109) which has two side lips (102) respectively formed on two ends thereof to engage with the top frame strips (144) for position limitation; a pair of vertical flanges (101) being under the top flange (109) and a flange support (108) disposed horizontally between the vertical flanges (101); wherein the middle clamp (10) is fixedly connected with one of the engaging slide blocks (5), which engages with the first engaging open cavity (21), via a fastening bolt (151); and
   an L-shaped fastener (13), including a vertical flange (134) and a horizontal flange (135), wherein the vertical flange (134) is fixedly connected with the other engaging slide block (5), which engages with the second engaging open cavity (23), via a fastening bolt (153).

2. The fastening system for a panel as claimed in claim 1, wherein:
   a sliding open groove with a plane bottom (26) is formed in one side of the mounting rail (1) which is on the back side of the second engaging open cavity (23); and
   the fastening system for a panel further comprises:
   a back clamp (11), including a horizontal flange (114) and a vertical flange (115), a side lip (111) formed on each of the free ends of the horizontal flange (114) and the vertical flange (115); and
   a bolt (155), having an end shape corresponding to the shape of the sliding open groove with a plane bottom (26) and slidably disposed in the sliding open groove with a plane bottom (26), wherein the vertical flange (115) and the bolt (155) are fastened and the horizontal flange (114) is fixedly connected with the back frame (146) via a bolt.

3. The fastening system for a panel as claimed in claim 2, further comprising:
   an end clamp (12), being ⊐-shaped and having a top flange (124), a vertical flange (125) and a horizontal flange (126) connected in turn, wherein the top flange (124) has a side lip (122) formed on the end thereof to engage with the top frame strip (144) for position limitation; the horizontal flange (126) is tightly connected with an engaging slide block, which is engaged with the first engaging open cavity (21), via a fastening bolt (159).

4. The fastening system for a panel as claimed in claim 3, wherein:
   the engaging slide block has two parallel grooves (51) formed in an upper surface thereof and two parallel recesses with inclined faces (52) or right-angled recesses (52') formed in a lower surface thereof; and
   each of the first engaging open cavity (21) and the second engaging open cavity (23) has a pair of protruding portions (211, 231) engaged with the grooves (15) and a pair of parallel foot poles (213, 233) which has a pair of feet with inclined faces (212, 232) or right-angled feet (212', 232') formed on top ends thereof, and the pair of feet with inclined faces (212, 232) or right-angled feet (212', 232') is engaged with the recesses with inclined faces (52) or the right-angled recesses (52') of the engaging slide block.

5. The fastening system for a panel as claimed in claim 4, wherein the panel (14) is a solar panel module.

6. The fastening system for a panel as claimed in claim 1 further comprising:
   an end clamp (12), being ⊐-shaped and having a top flange (124), a vertical flange (125) and a horizontal flange (126) connected in turn, wherein the top flange (124) has a side lip (122) formed on the end thereof to engage with the top frame strip (144) for position limitation; the horizontal flange (126) is tightly connected with an engaging slide block, which is engaged with the first engaging open cavity (21), via a fastening bolt (159).

7. The fastening system for a panel as claimed in claim 6, wherein:
   the engaging slide block has two parallel grooves (51) formed in an upper surface thereof and two parallel recesses with inclined faces (52) or right-angled recesses (52') formed in a lower surface thereof; and
   each of the first engaging open cavity (21) and the second engaging open cavity (23) has a pair of protruding portions (211, 231) engaged with the grooves (15) and a pair of parallel foot poles (213, 233) which has a pair of feet with inclined faces (212, 232) or right-angled feet (212', 232') formed on top ends thereof, and the pair of feet with inclined faces (212, 232) or right-angled feet (212', 232') is engaged with the recesses with inclined faces (52) or the right-angled recesses (52') of the engaging slide block.

8. The fastening system for a panel as claimed in claim 7, wherein the panel (14) is a solar panel module.

* * * * *